United States Patent
Wolfram et al.

(10) Patent No.: US 6,276,718 B1
(45) Date of Patent: Aug. 21, 2001

(54) MOBILE MACHINE WITH TELESCOPIC SUPPORT STRUTS

(75) Inventors: Markus Wolfram, Aichtal; Stephan Höness, Sonnenbühl, both of (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/486,076

(22) PCT Filed: Jul. 17, 1998

(86) PCT No.: PCT/EP98/04456

§ 371 Date: Apr. 28, 2000

§ 102(e) Date: Apr. 28, 2000

(87) PCT Pub. No.: WO99/10212

PCT Pub. Date: Mar. 4, 1999

(30) Foreign Application Priority Data

Aug. 21, 1997 (DE) .............................................. 197 36 108

(51) Int. Cl.⁷ .................................................. B66C 23/78
(52) U.S. Cl. ..................... 280/765.1; 212/302; 280/766.1
(58) Field of Search ........................... 280/763.1, 764.1, 280/765.1, 766.1, 762; 212/302, 305, 301, 304

(56) References Cited

U.S. PATENT DOCUMENTS

| | | | |
|---|---|---|---|
| 3,362,544 | * | 1/1968 | Wellnitz .................................. 212/49 |
| 3,495,727 | * | 2/1970 | Long ....................................... 212/49 |
| 3,985,036 | * | 10/1976 | Decker et al. ............................ 74/96 |
| 3,987,563 | * | 10/1976 | Baur ....................................... 212/145 |
| 4,280,318 | * | 7/1981 | Koch ....................................... 56/221 |
| 4,394,913 | * | 7/1983 | Lanning et al. ........................ 212/189 |
| 4,609,204 | * | 9/1986 | Nekola ................................. 280/766.1 |
| 4,624,357 | * | 11/1986 | Oury et al. ............................ 198/313 |
| 4,723,667 | * | 2/1988 | Zimmerman .......................... 212/189 |
| 5,398,969 | * | 3/1995 | Wimmer ............................. 280/766.1 |
| 5,638,967 | * | 6/1997 | Heckmann ........................... 280/763.1 |
| 5,706,960 | * | 1/1998 | Pitman et al. ......................... 212/304 |
| 5,961,145 | * | 10/1999 | Schillinger et al. ............... 280/764.1 |
| 6,092,975 | * | 7/2000 | Cannon, Jr. et al. .............. 280/766.1 |

FOREIGN PATENT DOCUMENTS

3124029 * 3/1983 (DE) .
357988 * 3/1983 (EP) .

* cited by examiner

*Primary Examiner*—Michael Mar
(74) *Attorney, Agent, or Firm*—Pendorf & Cutliff

(57) ABSTRACT

A mobile machine, especially a self-propelling concrete pump, comprising a chassis (10) and at least one support strut (20) displaceable in a preferably horizontally oriented tubular or box-shaped telescopic section (18) between a retracted transport position to at least one extended support position, and supportable on the ground via a foot part (26) provided at its free end. In order to alter the support width across the support strut, in accordance with the invention, the support strut (30) has at least two strut parts (40, 42) which can pivot around an articulated axis (46), the axis being parallel to the vertical axis of the vehicle chassis (10).

15 Claims, 4 Drawing Sheets

MOBILE MACHINE WITH TELESCOPIC SUPPORT STRUTS

BACKGROUND OF THE INVENTION

The invention concerns a mobile working machine including a chassis with at least front and rear axles carrying the working machine, a preferably horizontally oriented telescope segment provided on the chassis, and a support strut moveable between a retracted transport position and at least one extended work position, and supportable on the ground via at least one preferably extendable foot part provided at the free end of the support strut.

DESCRIPTION OF THE RELATED ART

A working machine of the above-described type, designed as a mobile cement pump, is known (EP-B 0 357 988) in which two diagonally forward directed support struts are provided designed as telescoping legs, with their tubular shaped telescope segments provided on a chassis rigidly connected to a mast block, with struts slideable between a retracted transport position and an extended support position in the telescope segments which cross over each other. The diagonal telescoping struts do make it possible to set up the cement pump even in a construction area in which vehicles with front pivoting struts or telescopic pivot struts would not find room. However, the traffic conditions on the streets, and the space problem in construction areas, often do not permit a supporting stance of the support struts in full breadth perpendicular to the vehicle. It is thus frequently necessary to restrict the support breadth.

SUMMARY OF THE INVENTION

Beginning herewith, the present invention is concerned with the task of improving the known work machine in such a manner that with simple means a modification of the support breadth via the support struts is made possible.

The inventive solution is based on the concept, that in many situations which occur in the real world, in which work is accomplished on only one side of the work machine, it is desirable when the front support strut, on the side opposite to the side where work is occurring, provides support as close-in and as far in front of the driver's cabin of the vehicle chassis as possible, with the object of maximizing the forward tip-axis. In order to achieve this, it is proposed in accordance with the invention that the support strut includes at least two strut parts which can pivot around an articulated joint axis, the axis being parallel to the vertical axis of the chassis. The support strut is preferably comprised of an inner strut part continuously and sturdily in communication with the telescope segment and an outer strut part pivotal with respect to the inner strut part about a linkage axis and carrying the foot part. If the support strut is extended out of the telescope segment and if the linkage axis is situated outside of the telescope segment, then the outer strut part can be pivoted about the pivot or linkage axis, so that it can be pivoted up close to the chassis so that the work machine can thereby be supported close-in. For the wide-stance support, the strut parts are locked or arrested with respect to each other in the extended position, preferably in alignment. For particularly broad stance supporting, it is of advantage, when the strut part on the foot part side is comprised of at least two telescopic parts.

In accordance with a first preferred embodiment of the invention, it is envisioned that in the retracted transport position with aligned strut parts the linkage axis is provided within the telescope segment, and in the extended support position it is provided outside of the telescope segment.

With greater support breadths, it can be of advantage, when the linkage axis is provided outside of the chassis-fixed telescope segment both in the retracted transport position as well also in the extended work position. Herein the foot-part carrying strut part can, in the transport position of the support strut, be pivoted about the linkage axis against the longitudinal side of the vehicle chassis and be arrested or locked in this position for transport. A further preferred embodiment of the invention envisions that the chassis-fixed telescope segment is provided on the chassis spaced apart behind the front axle or the driver cabin and, with its support strut outlet end, is directed transversely or diagonally in the direction of the front axle or driver cabin. Preferably herein two telescope segments for receiving respectively one support strut or one strut part are provided facing opposite sides of the vehicle chassis and crossing the vehicle chassis longitudinal axis in different planes or levels, the telescope segments being fixed to the chassis.

A further alternative variation of the invention envisions, that the telescope segment and the support strut are bowed in the manner of an arc. The telescope segment can transversely cross over the vehicle longitudinal axis behind the front axle or the driver cabin and at the outlet side be directed diagonally in the direction of the front axle or driver cabin, or can be oriented tangentially to the vehicle longitudinal axis and at the outlet side be directed diagonally sideways in the extension direction.

In order to ensure a secure stance, it is advantageous when a locking mechanism is provided for locking the support struts in at least one predetermined angular position against rotation about the linkage or pivot axis. Further, in accordance with the invention it is proposed to provided a pivot mechanism between the support strut parts, which may involve a rotary motor or a hydraulic cylinder.

BRIEF DESCRIPTION OF THE DRAWINGS

In the following, the invention will be described in greater detail on the basis of the illustrative embodiments shown in the drawings. There is shown.

DETAILED DESCRIPTION OF THE INVENTION

Figure 1:
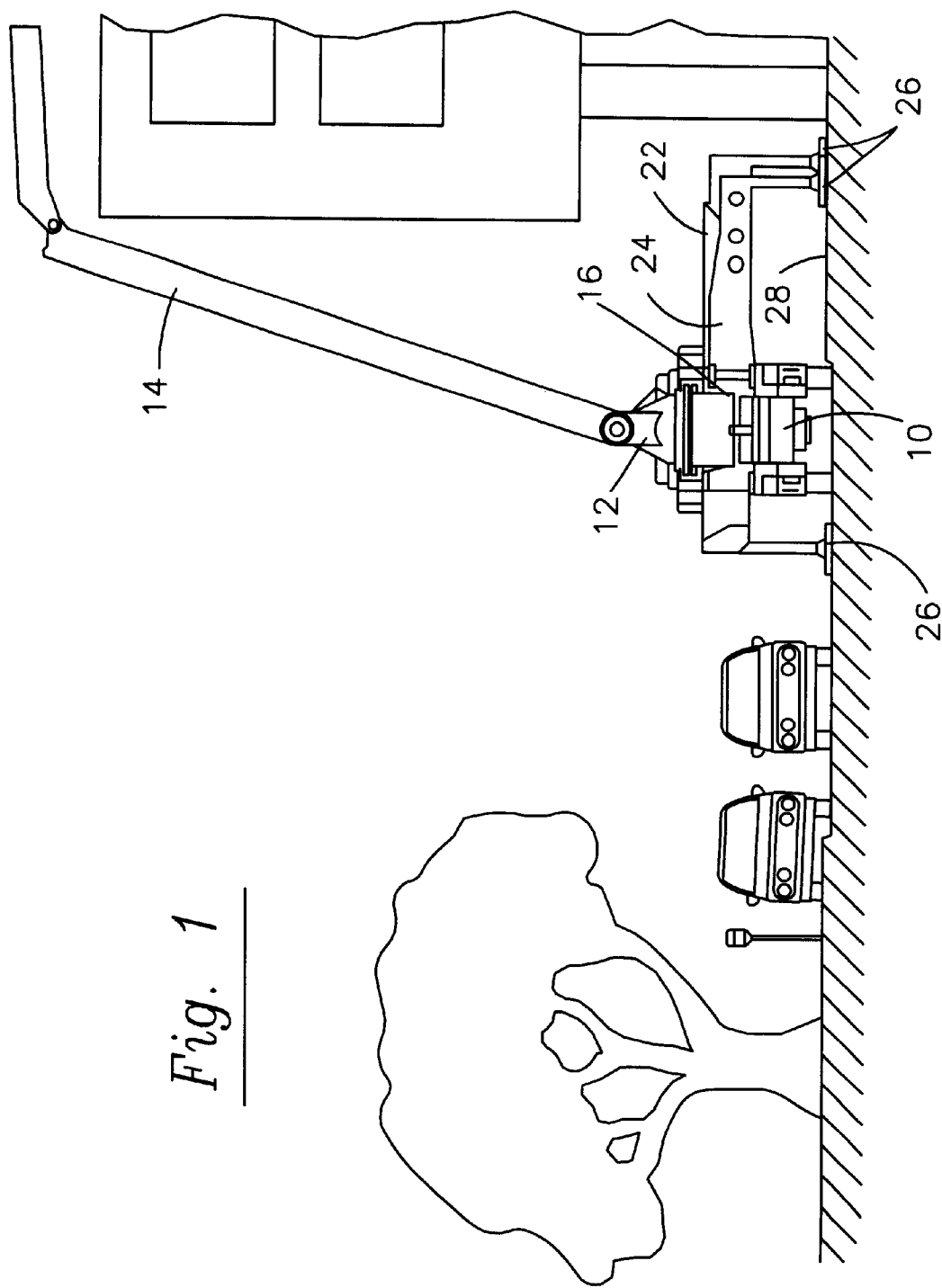
FIG. 1a view of a mobile cement pump parked at the edge of a street with support struts supported narrowly on the street side.

The mobile cement pump shown in the figures is essentially comprised of a multi-axle vehicle chassis 10 with a driver cabin 11, a cement distribution mast 14 mounted for pivoting about the vertical axis on a mast block 12 close to the front axle and a support structure, comprised of a chassis-fixed carrier frame 16, two front support struts 20 displaceable in diagonally oriented displacement guide boxes 18 on the carrier frame 16 and two rear support struts 24 pivotable about the vertical axis 22. The support struts 20, 24 are respectively supportable on the ground 28 via one downwards extendable foot part 26. Hydraulic work cylinders 30 are provided for pivoting the rear support strut 24, of which the piston rod 32 is linked to a support strut linkage point 34, and of which the cylinder part 36 is linked to a chassis fixed linkage point 38.

Figure 2A:
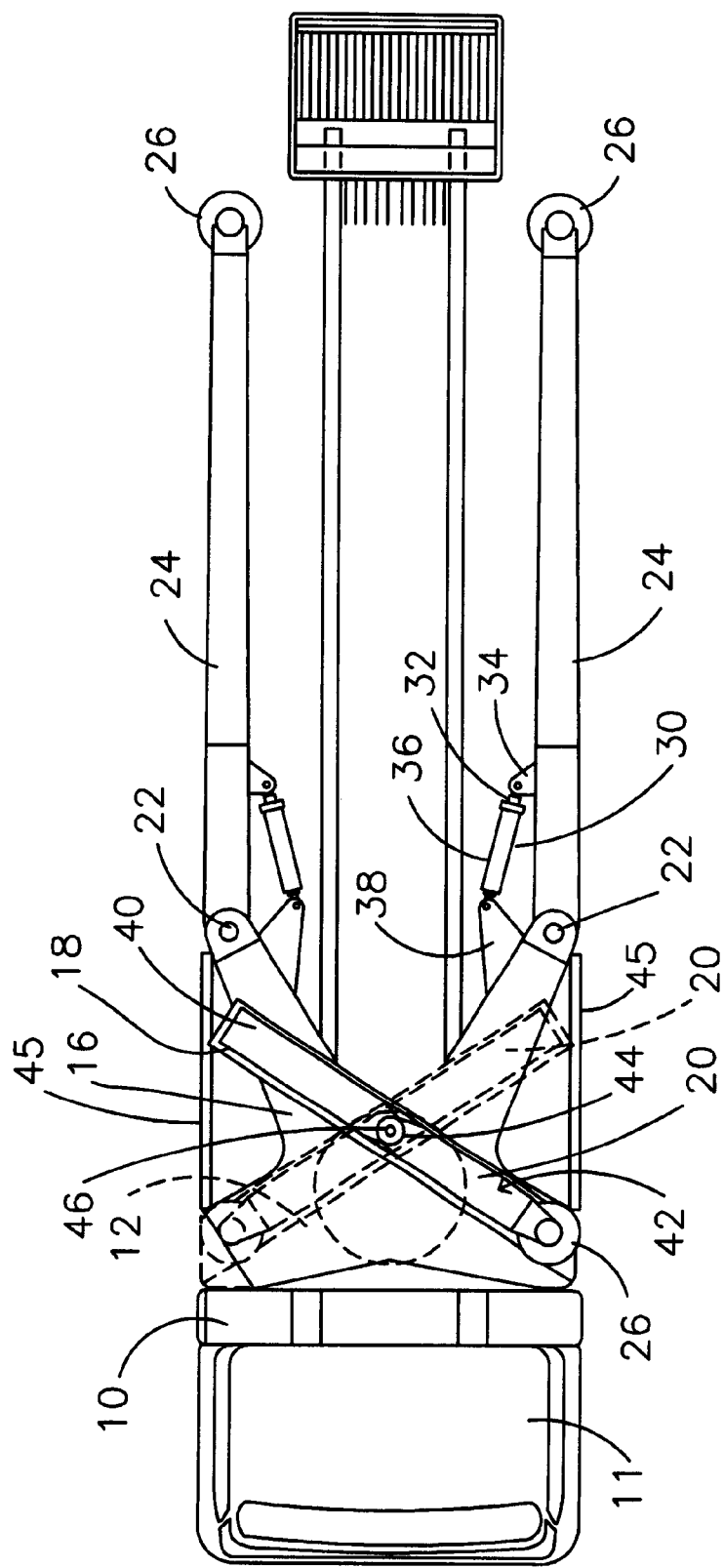
FIGS. 2a and b a top view of a vehicle chassis of a mobile cement pump with telescopic front support struts in retracted transport position (FIG. 2a) and in extended support position (FIG. 2b)
Figure 2B:
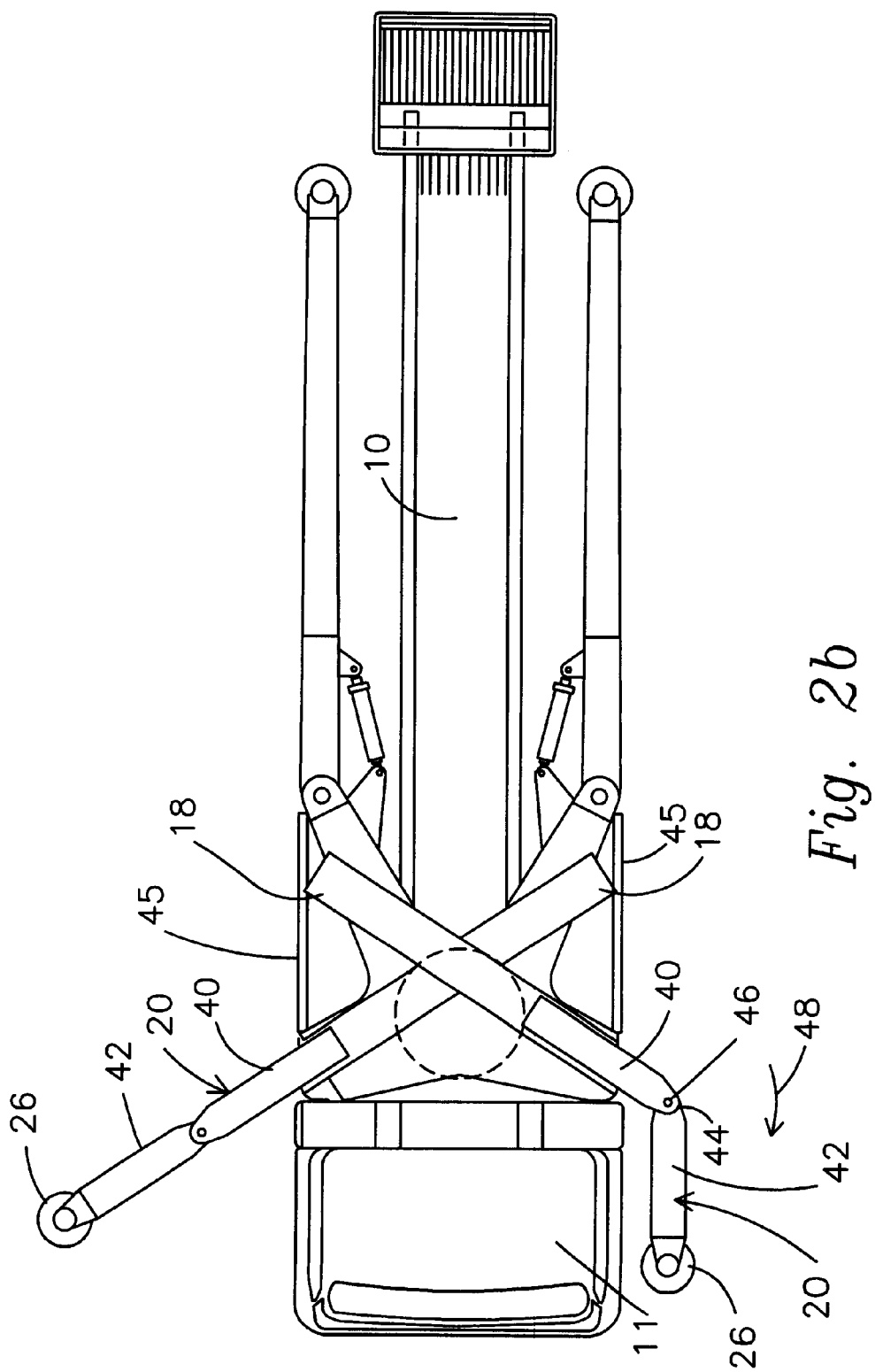

The front support struts 20 are respectively comprised of two support strut parts 40, 42, which are connected to each other via pivot linkage 44 for pivoting about pivot axis 46 parallel to the vehicle chassis vertical axis. In the illustrative embodiment according to FIGS. 2a, b the support strut parts 40, 42 are dimensioned in their length, so that in the retracted transport position shown in FIG. 2a the pivot linkage 44 is situated inside the displacement guide box 18 and the foot part 26 is retracted to the longitudinal side edge 45 of the vehicle chassis 10. The pivot linkage 44 makes possible two different support positions of the front support strut 20: on the one hand, the broad support stance shown in FIG. 2b top with support strut 20 extended completely out of the extension guide box 18 and with aligned support strut parts 40, 42 as well as, on the other hand, as shown in FIG. 2b bottom, the narrow support stance in which support strut 20 is only extended partially out of the extension guide box 18 and outer support strut part 42 is pivoted about the linkage axis 46 in the direction of the arrow 48 towards the driver cabin 11.

Figure 3:
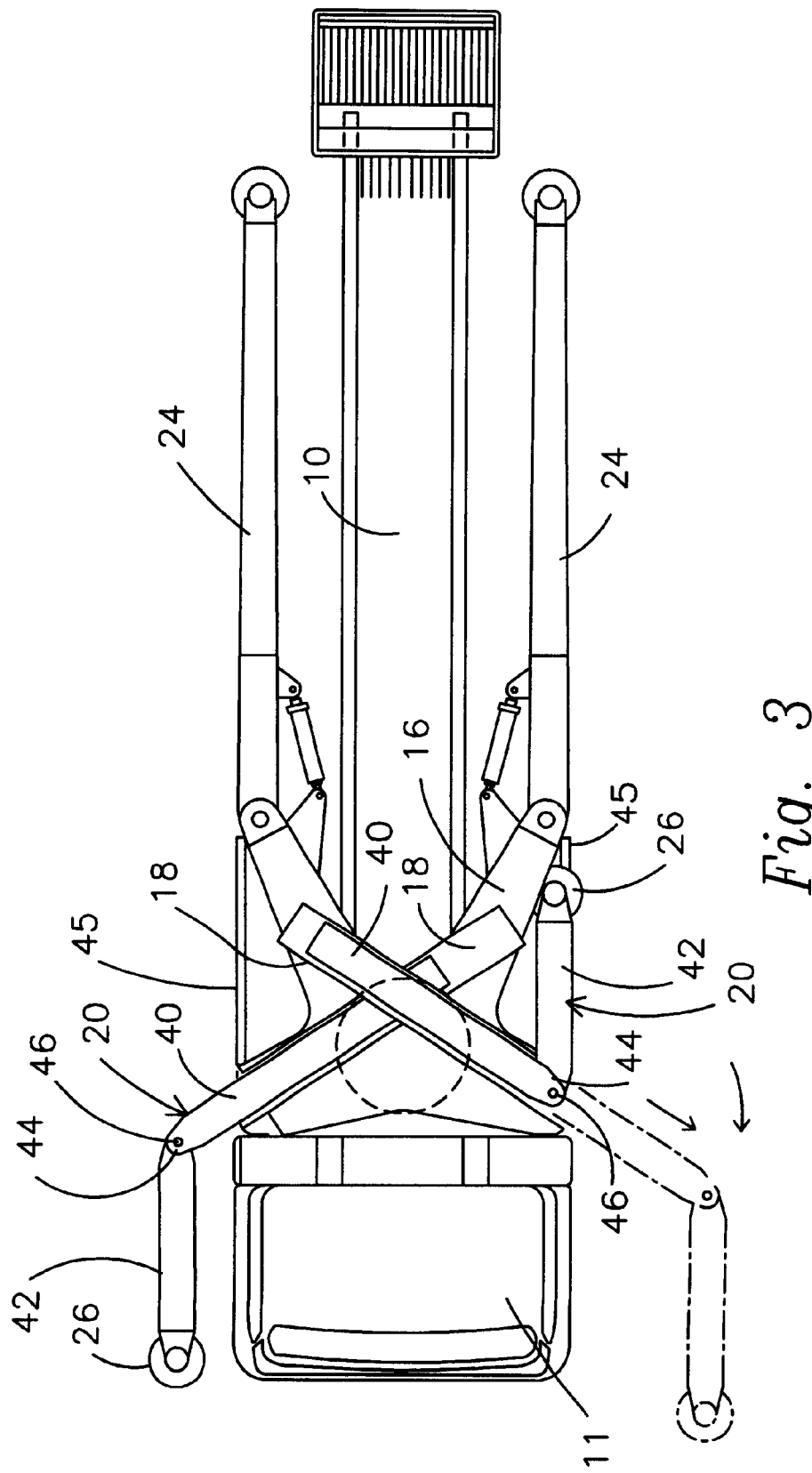
FIG. 3 a top view of a vehicle chassis of a cement: pump with, in comparison to FIGS. 2 and 3, an alternative form of telescopic support struts.

In the embodiment shown in FIG. 3, in the retracted transport position of the support strut 20, the pivot linkage 44 is situated outside of the extension guide box 18 while the outer support strut part 42 is pivoted towards the back parallel to the longitudinal side edge 45 of the vehicle chassis 10 (FIG. 3 bottom). As before, in this embodiment two support positions are also possible: that shown in dashed lines in the lower part of FIG. 3 provides broad support with extended support strut parts 40, 42 aligned to each other, and the narrow or close-in support stance shown in the upper part of FIG. 3 with only partially extended inner support strut part 40 and with outer support strut part 42 pivoted forwards against the driver cabin 11. The pivot linkage 44 is lockable in the various angular positions with the aid of a not-shown locking mechanism. Beyond this there are provided, not shown in the drawing, drive means for the displacement of the support strut 20 in the extension guide box 18 as well as for the pivoting of the support strut parts 40, 42 about the linkage axis 46.

In summary the following is to be concluded: The invention relates to a mobile machine, especially a self-propelling concrete pump, comprising a chassis (10) and at least one support strut (20) displaceable in a preferably horizontally oriented tubular or box-shaped telescopic section (18) between a retracted transport position to at least one extended support position, and supportable on the ground via a fool part (26) provided at its free end. In order to provide a simple means of altering the support width across the support strut, in accordance with the invention, the support strut (30) has at least two strut parts (40, 42) which can pivot around an articulated axis (46), said axis being parallel to the vertical axis of the vehicle chassis (10).

What is claimed is:

1. A mobile work machine with a driver cab, a vehicle chassis (10) with at least one front axle and one rear axle, at least one telescopic segment (18) affixed to the vehicle chassis (10), and a support strut (20) moveable between a retracted transport position and at least one extended ground engaging supporting position, the support strut having a free end with a foot part (26) for engagement with a ground surface, wherein the support strut (20) includes at least one inner and one outer strut part (40, 42) pivotable with respect to each other about a linkage axis (46) which is parallel to a vehicle vertical axis of the vehicle chassis, of which the one inner strut part (40) is in telescopic engagement within and in alignment with the telescopic segment (18), while the outer strut part (42) carrying the foot part (26) is pivotable with respect to the inner strut part about the linkage axis (46), and wherein the vehicle affixed telescopic segment (18) is provided spaced apart behind the driver cab (11), such that the vehicle chassis affixed telescopic segment (18) has an outlet facing forwardly, and diagonally in the direction of the driver cab (11), and such that (a) during complete extension of the inner strut part (40) relative to the telescopic segment, the outer strut part (42) can be brought into a first support position in axial alignment with the inner strut part (40), and (b) during a partial extension of the inner strut part (40) relative to the telescopic segment, the outer strut part (42) is pivotable about the linkage axis (46) towards the driver cab into a second support position extending parallel to a longitudinal axis of the vehicle chassis axis and can be locked in the second support position together with the inner strut part (40), wherein the linkage axis (46) is located within the telescopic segment when the inner strut part is in a fully retracted position within the telescopic segment.

2. A mobile work machine according to claim 1, wherein, in the retracted transport position, the linkage axis (46) is within the telescopic segment (18), and in the extended supporting position the strut parts (40, 42) and linkage axis (18) extend outside of the telescopic segment (18).

3. A mobile work machine according to claim 1, wherein two telescopic segments (18) are provided, facing opposite sides of the vehicle chassis and crossing over the vehicle chassis longitudinal axis at different levels.

4. A mobile work machine according to claim 1, wherein the telescopic segment (18) and the support strut (20) are curved.

5. A mobile work machine according to claim 4, wherein the telescopic segment (18) crosses diagonally over the vehicle longitudinal axis behind the front axle and has it's outlet side facing forward, and diagonally outwards.

6. A mobile work machine according to claim 4, wherein the telescopic segment (18) crosses diagonally over the vehicle longitudinal axis behind the driver cab (11) and has it's outlet side facing forward, and diagonally outwards.

7. A mobile work machine according to claim 4, wherein the telescopic segment (18) is oriented tangential to the vehicle longitudinal axis and has it's outlet facing diagonal to the forward direction vehicle chassis.

8. A mobile work machine according to claim 1, wherein the outer strut part (42) is comprised of at least two telescopic parts.

9. A mobile work machine according to claim 1, further comprising a locking mechanism for locking the strut parts (40, 42) in at least one predetermined angular position against rotation about their linkage axis (46).

10. A mobile work machine according to claim 1, further comprising a power pivot mechanism between the strut parts (40, 42).

11. A mobile work machine according to claim 10, wherein, the pivot mechanism includes a rotary motor.

12. A mobile work machine according to claim 11, wherein the pivot mechanism includes a hydraulic cylinder.

13. A mobile work machine according to claim 1, wherein said telescopic segment (18) is oriented horizontally.

14. A mobile work machine according to claim 1, wherein said foot part is moveable between an extended support position and a retracted transport position.

15. A mobile work machine with a driver cab, a vehicle chassis (10) with at least one front axle and one rear axle, at least one telescopic segment (18) affixed to the vehicle chassis (10), and a support strut (20) moveable between a retracted transport position and at least one extended ground engaging supporting position, the support strut having a free end with a foot part (26) for engagement with a ground surface, wherein the support strut (20) includes at least one inner and one outer strut part (40, 42) pivotable with respect to each other about a linkage axis (46) which is parallel to a vehicle vertical axis of the vehicle chassis, of which the one inner strut part (40) is in telescopic engagement within and in alignment with the telescopic segment (18), while the outer strut part (42) carrying the foot part (26) is pivotable with respect to the inner strut part about the linkage axis (46) when the inner strut part is in an extended position, wherein the vehicle affixed telescopic segment (18) is provided spaced apart behind the driver cab (11), such that the vehicle chassis affixed telescopic segment (18) has an outlet facing forwardly, and diagonally in the direction of the driver cab (11), and such that (a) during complete extension of the inner strut part (40) relative to the telescopic segment, the outer strut part (42) can be brought into a first ground surface engaging support position in axial alignment with the inner strut part (40), and (b) during a partial extension of the inner strut part (40) relative to the telescopic segment, the outer strut part (42) is pivotable about the linkage axis (46) into a second ground surface engaging support position extending parallel to a longitudinal axis of the vehicle chassis axis in the forward or rearward direction and can be locked in the second support position together with the inner strut part (40).

\* \* \* \* \*